US012646976B2

(12) United States Patent
Liao et al.

(10) Patent No.: US 12,646,976 B2
(45) Date of Patent: Jun. 2, 2026

(54) WIRELESS CHARGING SYSTEM AND CONTROL METHOD THEREOF

(71) Applicant: Delta Electronics (Shanghai) CO., LTD, Shanghai (CN)

(72) Inventors: Yongkai Liao, Shanghai (CN); Xuecong Xu, Shanghai (CN); Qing Jiang, Shanghai (CN)

(73) Assignee: Delta Electronics (Shanghai) CO., LTD., Shanghai (CN)

( * ) Notice: Subject to any disclaimer, the term of this patent is extended or adjusted under 35 U.S.C. 154(b) by 650 days.

(21) Appl. No.: 18/169,231

(22) Filed: Feb. 15, 2023

(65) Prior Publication Data

US 2023/0307964 A1 Sep. 28, 2023

(30) Foreign Application Priority Data

Mar. 24, 2022 (CN) .......................... 202210303247.5

(51) Int. Cl.
H02J 50/80 (2016.01)
H02J 7/63 (2026.01)
(Continued)

(52) U.S. Cl.
CPC ............... H02J 50/80 (2016.02); H02J 7/63 (2026.01); H02J 7/82 (2026.01); H02J 7/933 (2026.01); H02J 50/20 (2016.02); H04B 5/79 (2024.01)

(58) Field of Classification Search
CPC ...... H02J 50/80; H02J 7/00306; H02J 7/0048; H02J 7/00712; H02J 50/20; H02J 7/00032;
(Continued)

(56) References Cited

U.S. PATENT DOCUMENTS

| | | | | |
|---|---|---|---|---|
| 8,629,654 | B2 * | 1/2014 | Partovi ................. | H02J 50/005 |
| | | | | 320/108 |
| 9,142,999 | B2 * | 9/2015 | Von Novak ............. | H02J 7/485 |
| 10,321,883 | B2 * | 6/2019 | Kim ..................... | A61B 6/4405 |
| 12,420,667 | B2 * | 9/2025 | Yang ..................... | B60L 3/0046 |

(Continued)

FOREIGN PATENT DOCUMENTS

| | | |
|---|---|---|
| CN | 2919648 Y | 7/2007 |
| CN | 100589304 C | 2/2010 |

(Continued)

OTHER PUBLICATIONS

1st Office Action dated Mar. 8, 2023 of Chinese Application No. 202210301854.8.

(Continued)

*Primary Examiner* — M Baye Diao
(74) *Attorney, Agent, or Firm* — Qinghong Xu

(57) ABSTRACT

The present disclosure provides a wireless charging system and a control method thereof. The control method includes: when the battery pack is in over-discharged state, controlling the power transmitting module to wirelessly transmit first preset power, i.e., auxiliary electrical energy, to the power receiving module; when the power receiving module receives auxiliary electrical energy, controlling the transmitter wireless communication module to establish wireless communication with the receiver wireless communication module; after wireless communication is established, controlling the power transmitting module to wirelessly transmit first charge signal to the power receiving module enabling the power receiving module charges the battery pack at a first preset current; and after the battery pack recovers to normal charging state, controlling the power transmitting module to wirelessly transmit second charge signal to the power receiving module enabling the power receiving module charges the battery pack at a second preset current.

22 Claims, 7 Drawing Sheets

(51) Int. Cl.

| | |
|---|---|
| *H02J 7/82* | (2026.01) |
| *H02J 7/90* | (2026.01) |
| *H02J 50/20* | (2016.01) |
| *H04B 5/79* | (2024.01) |

(58) Field of Classification Search
CPC .... H02J 7/0047; H02J 7/007182; H04B 5/79; Y02E 60/10
USPC .......................................... 320/108; 455/573
See application file for complete search history.

(56) References Cited

U.S. PATENT DOCUMENTS

| | | | |
|---|---|---|---|
| 2006/0284593 A1* | 12/2006 | Nagy ...................... | H02J 50/23 |
| | | | 320/109 |
| 2011/0279226 A1* | 11/2011 | Chen ....................... | B60L 53/12 |
| | | | 340/5.8 |
| 2013/0026981 A1* | 1/2013 | Van Der Lee .......... | H04B 5/79 |
| | | | 320/108 |
| 2014/0176306 A1 | 6/2014 | Lee et al. | |
| 2016/0064997 A1* | 3/2016 | Hur .......................... | H02J 7/04 |
| | | | 320/108 |
| 2016/0336791 A1 | 11/2016 | Na et al. | |
| 2018/0046891 A1 | 2/2018 | Jung | |
| 2019/0081510 A1* | 3/2019 | Liao ....................... | H02J 50/70 |
| 2019/0115782 A1* | 4/2019 | Tseng ..................... | H02J 50/10 |
| 2019/0258472 A1 | 8/2019 | Kim et al. | |
| 2019/0392320 A1* | 12/2019 | Kim ....................... | B60L 58/12 |
| 2022/0255358 A1* | 8/2022 | Mao ...................... | B60L 53/126 |
| 2023/0142856 A1 | 5/2023 | Choi et al. | |

FOREIGN PATENT DOCUMENTS

| | | | |
|---|---|---|---|
| CN | 101488593 | B | 2/2011 |
| CN | 102738530 | A | 10/2012 |
| CN | 103684535 | A | 3/2014 |
| CN | 103986211 | A | 8/2014 |
| CN | 104184500 | A | 12/2014 |
| CN | 105472534 | A | 4/2016 |
| CN | 106170007 | A | 11/2016 |
| CN | 107105073 | A | 8/2017 |
| CN | 107679604 | A | 2/2018 |
| CN | 109494889 | A | 3/2019 |
| CN | 109698562 | A | 4/2019 |
| CN | 110730021 | A | 1/2020 |
| CN | 111817448 | A | 10/2020 |
| CN | 111884361 | A | 11/2020 |
| CN | 113500977 | A | 10/2021 |
| CN | 114202333 | A | 3/2022 |
| WO | 2020134759 | A1 | 7/2020 |
| WO | 2022001343 | A1 | 1/2022 |

OTHER PUBLICATIONS

Notice of Allowance dated May 22, 2024 of Chinese Application No. 202210301854.8.
1st Office Action dated Jun. 21, 2025 of Chinese Application No. 2022103032475.
Notice of Allowance dated Jun. 10, 2025 of U.S. Appl. No. 18/173,109.

* cited by examiner

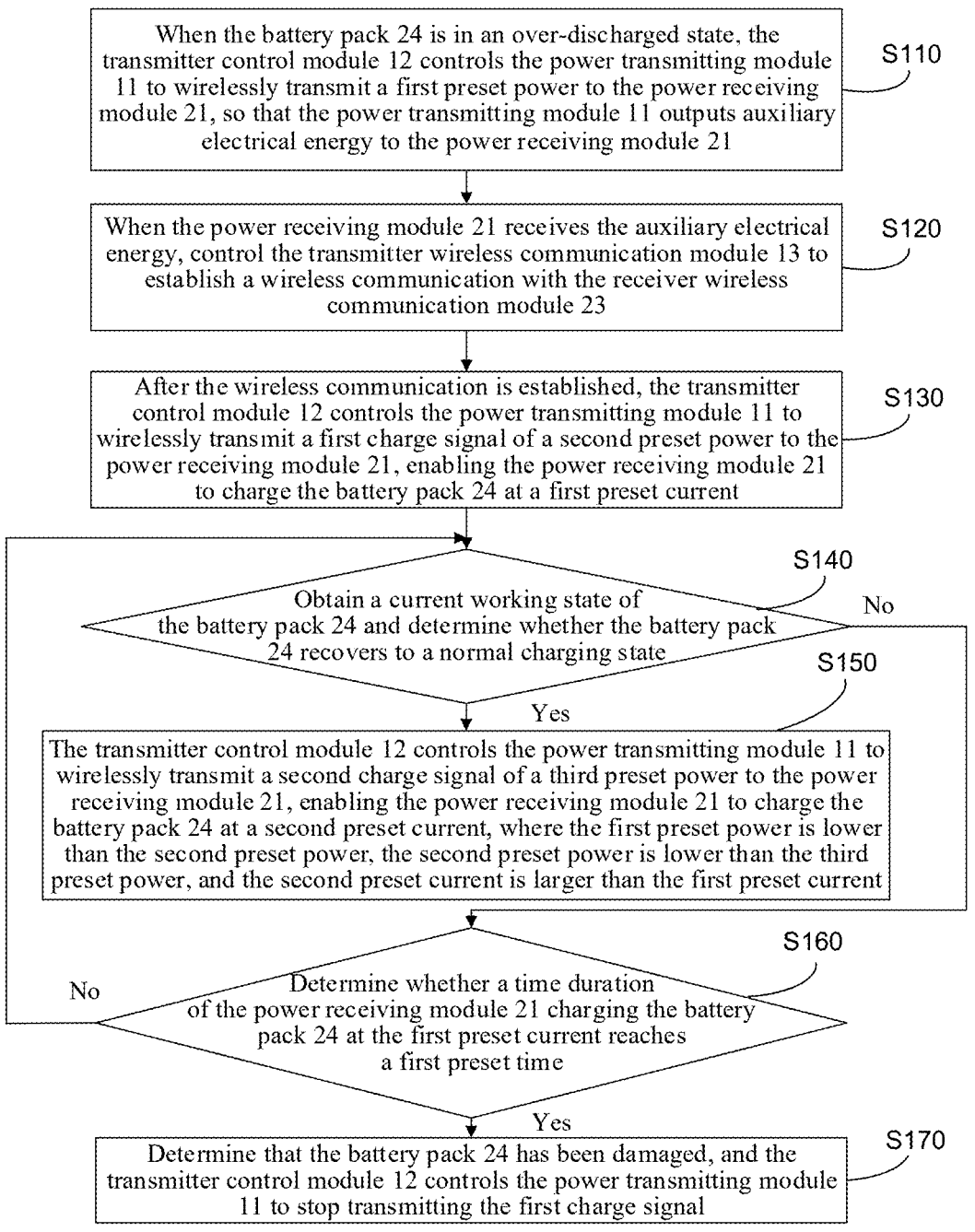

When the battery pack 24 is in an over-discharged state, the transmitter control module 12 controls the power transmitting module 11 to wirelessly transmit a first preset power to the power receiving module 21, so that the power transmitting module 11 outputs auxiliary electrical energy to the power receiving module 21                    S110

When the power receiving module 21 receives the auxiliary electrical energy, control the transmitter wireless communication module 13 to establish a wireless communication with the receiver wireless communication module 23                    S120

After the wireless communication is established, the transmitter control module 12 controls the power transmitting module 11 to wirelessly transmit a first charge signal of a second preset power to the power receiving module 21, enabling the power receiving module 21 to charge the battery pack 24 at a first preset current                    S130

Obtain a current working state of the battery pack 24 and determine whether the battery pack 24 recovers to a normal charging state                    S140          No Yes                    S150

The transmitter control module 12 controls the power transmitting module 11 to wirelessly transmit a second charge signal of a third preset power to the power receiving module 21, enabling the power receiving module 21 to charge the battery pack 24 at a second preset current, where the first preset power is lower than the second preset power, the second preset power is lower than the third preset power, and the second preset current is larger than the first preset current Determine whether a time duration of the power receiving module 21 charging the battery pack 24 at the first preset current reaches a first preset time                    S160

No

Yes

Determine that the battery pack 24 has been damaged, and the transmitter control module 12 controls the power transmitting module 11 to stop transmitting the first charge signal                    S170

FIG. 2

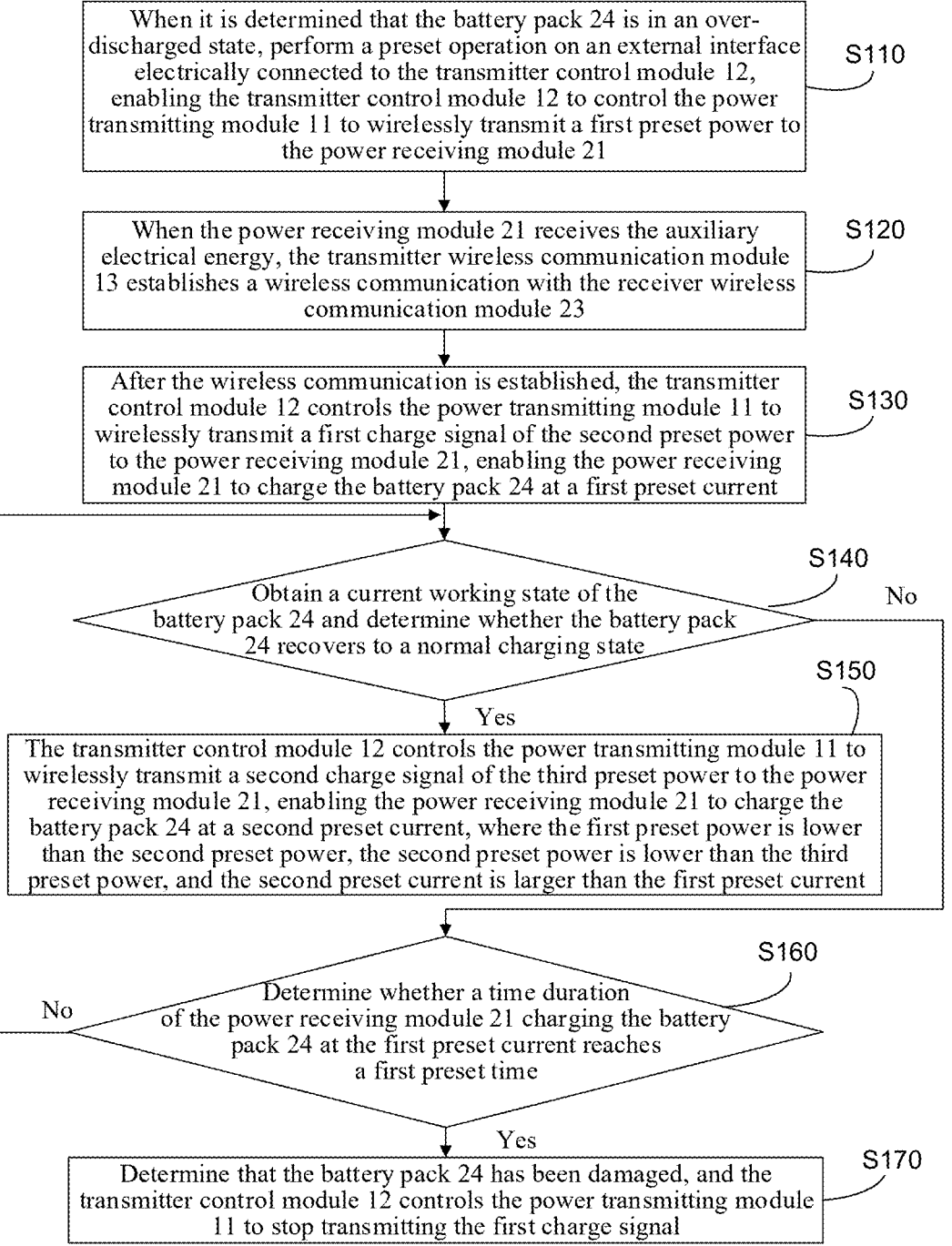

When it is determined that the battery pack 24 is in an over-discharged state, perform a preset operation on an external interface electrically connected to the transmitter control module 12, enabling the transmitter control module 12 to control the power transmitting module 11 to wirelessly transmit a first preset power to the power receiving module 21    S110

When the power receiving module 21 receives the auxiliary electrical energy, the transmitter wireless communication module 13 establishes a wireless communication with the receiver wireless communication module 23    S120

After the wireless communication is established, the transmitter control module 12 controls the power transmitting module 11 to wirelessly transmit a first charge signal of the second preset power to the power receiving module 21, enabling the power receiving module 21 to charge the battery pack 24 at a first preset current    S130

Obtain a current working state of the battery pack 24 and determine whether the battery pack 24 recovers to a normal charging state    S140    No Yes    S150

The transmitter control module 12 controls the power transmitting module 11 to wirelessly transmit a second charge signal of the third preset power to the power receiving module 21, enabling the power receiving module 21 to charge the battery pack 24 at a second preset current, where the first preset power is lower than the second preset power, the second preset power is lower than the third preset power, and the second preset current is larger than the first preset current Determine whether a time duration of the power receiving module 21 charging the battery pack 24 at the first preset current reaches a first preset time    S160    No Yes Determine that the battery pack 24 has been damaged, and the transmitter control module 12 controls the power transmitting module 11 to stop transmitting the first charge signal    S170

FIG. 3

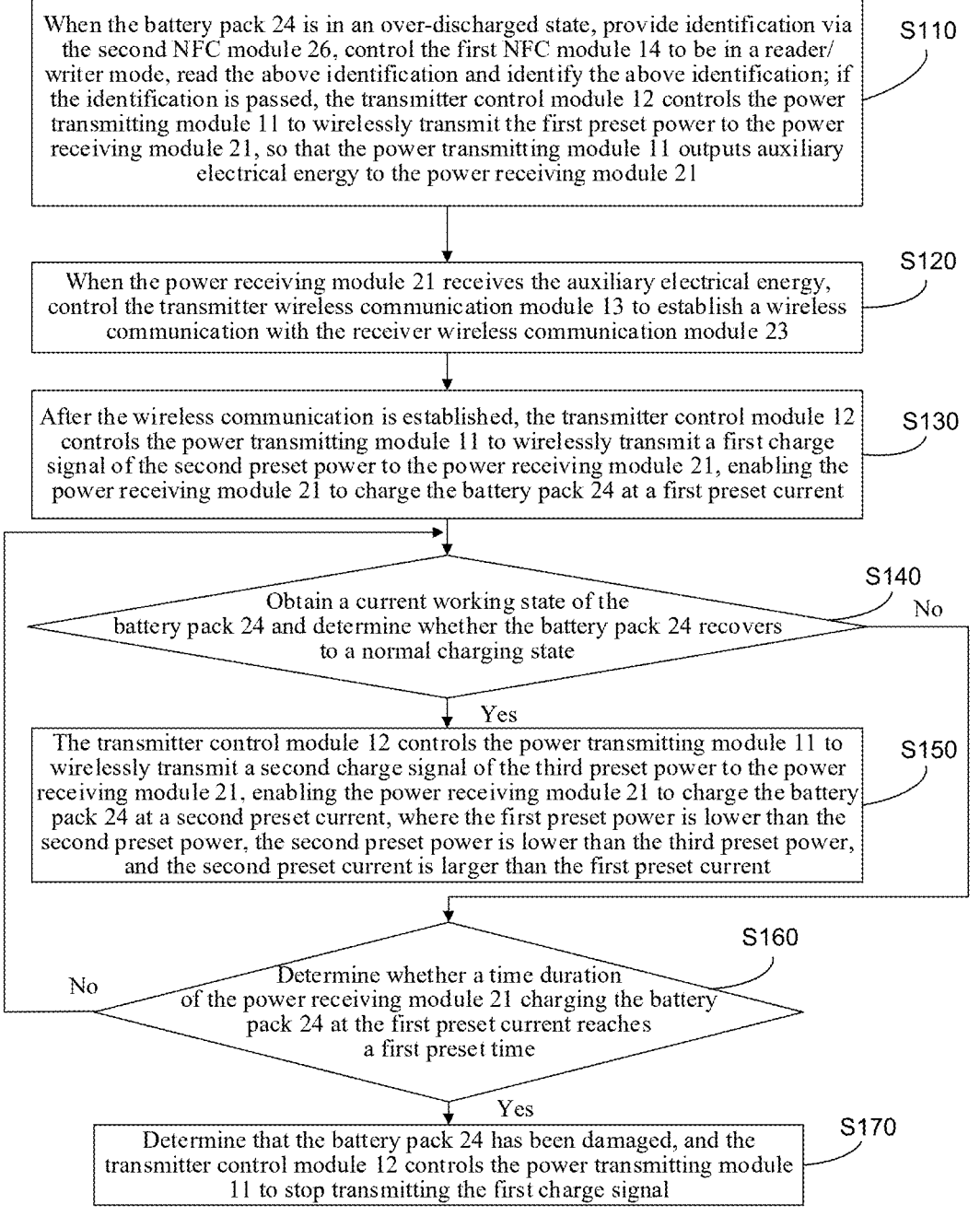

When the battery pack 24 is in an over-discharged state, provide identification via the second NFC module 26, control the first NFC module 14 to be in a reader/writer mode, read the above identification and identify the above identification; if the identification is passed, the transmitter control module 12 controls the power transmitting module 11 to wirelessly transmit the first preset power to the power receiving module 21, so that the power transmitting module 11 outputs auxiliary electrical energy to the power receiving module 21     S110

When the power receiving module 21 receives the auxiliary electrical energy, control the transmitter wireless communication module 13 to establish a wireless communication with the receiver wireless communication module 23     S120

After the wireless communication is established, the transmitter control module 12 controls the power transmitting module 11 to wirelessly transmit a first charge signal of the second preset power to the power receiving module 21, enabling the power receiving module 21 to charge the battery pack 24 at a first preset current     S130

Obtain a current working state of the battery pack 24 and determine whether the battery pack 24 recovers to a normal charging state     S140     No Yes The transmitter control module 12 controls the power transmitting module 11 to wirelessly transmit a second charge signal of the third preset power to the power receiving module 21, enabling the power receiving module 21 to charge the battery pack 24 at a second preset current, where the first preset power is lower than the second preset power, the second preset power is lower than the third preset power, and the second preset current is larger than the first preset current     S150

No

Determine whether a time duration of the power receiving module 21 charging the battery pack 24 at the first preset current reaches a first preset time     S160

Yes

Determine that the battery pack 24 has been damaged, and the transmitter control module 12 controls the power transmitting module 11 to stop transmitting the first charge signal     S170

FIG. 5

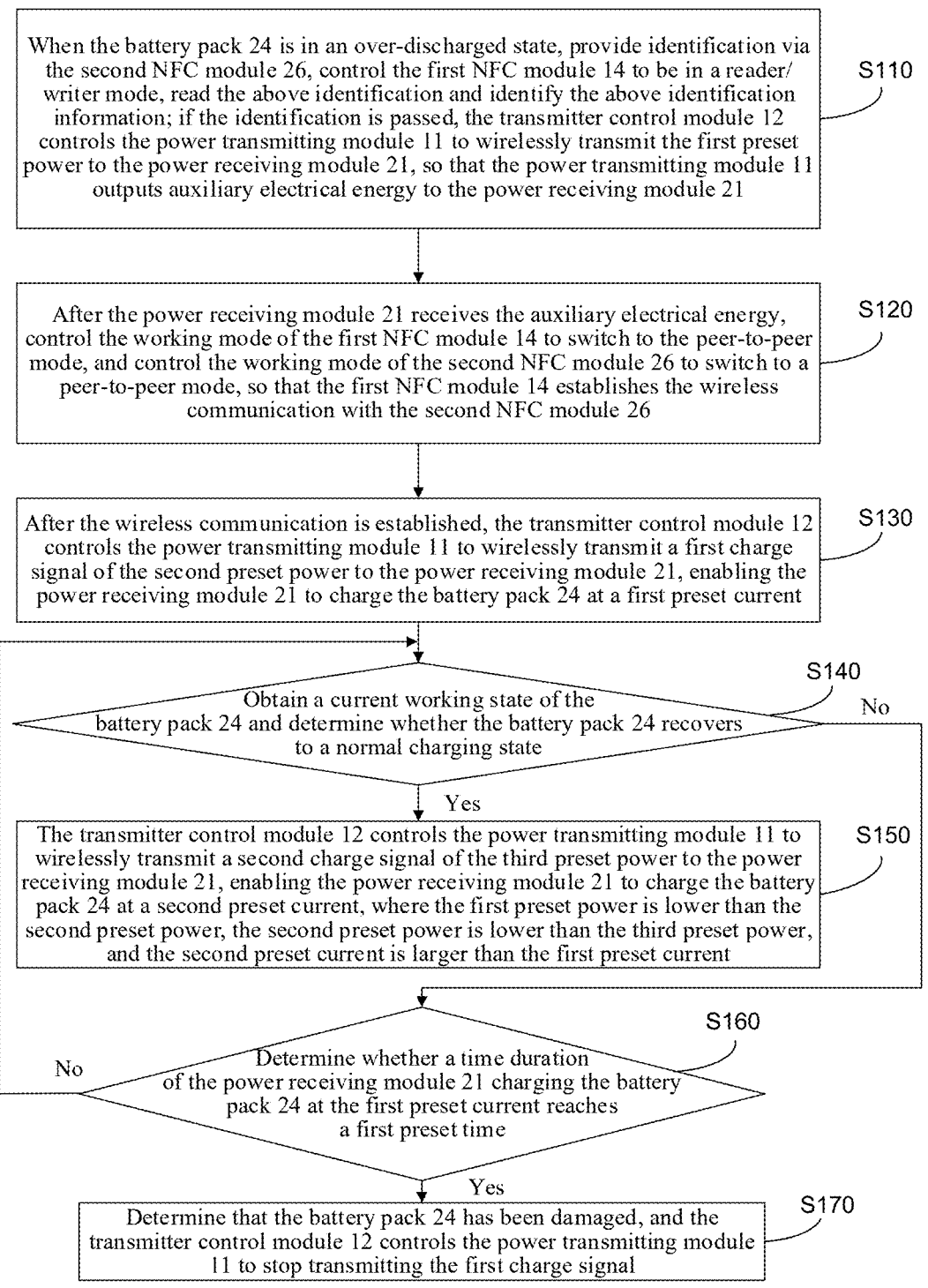

When the battery pack 24 is in an over-discharged state, provide identification via the second NFC module 26, control the first NFC module 14 to be in a reader/ writer mode, read the above identification and identify the above identification information; if the identification is passed, the transmitter control module 12 controls the power transmitting module 11 to wirelessly transmit the first preset power to the power receiving module 21, so that the power transmitting module 11 outputs auxiliary electrical energy to the power receiving module 21          S110

After the power receiving module 21 receives the auxiliary electrical energy, control the working mode of the first NFC module 14 to switch to the peer-to-peer mode, and control the working mode of the second NFC module 26 to switch to a peer-to-peer mode, so that the first NFC module 14 establishes the wireless communication with the second NFC module 26          S120

After the wireless communication is established, the transmitter control module 12 controls the power transmitting module 11 to wirelessly transmit a first charge signal of the second preset power to the power receiving module 21, enabling the power receiving module 21 to charge the battery pack 24 at a first preset current          S130

Obtain a current working state of the battery pack 24 and determine whether the battery pack 24 recovers to a normal charging state          S140          No Yes The transmitter control module 12 controls the power transmitting module 11 to wirelessly transmit a second charge signal of the third preset power to the power receiving module 21, enabling the power receiving module 21 to charge the battery pack 24 at a second preset current, where the first preset power is lower than the second preset power, the second preset power is lower than the third preset power, and the second preset current is larger than the first preset current          S150

Determine whether a time duration of the power receiving module 21 charging the battery pack 24 at the first preset current reaches a first preset time          S160

No

Yes

Determine that the battery pack 24 has been damaged, and the transmitter control module 12 controls the power transmitting module 11 to stop transmitting the first charge signal          S170

FIG. 6

WIRELESS CHARGING SYSTEM AND CONTROL METHOD THEREOF

CROSS REFERENCE

This application is based upon and claims priority to Chinese Patent Application No. 202210303247.5, filed on Mar. 24, 2022, the entire contents thereof are incorporated herein by reference.

TECHNICAL FIELD

The present disclosure relates to the field of wireless power transmission technologies, and in particular, to a wireless charging system and a control method thereof.

BACKGROUND

For wireless power transmission (WPT) apparatuses, in general, the transmitter transmits power to the receiver and then the receiver supplies electrical energy to the battery pack. In some application scenarios, the wireless power transmission and communication are not carried out simultaneously, resulting in discontinuous power transmission. In some other application scenarios, the wireless power transmission and communication are carried out simultaneously, that is, the electromagnetic field for the power transmission and the electromagnetic field for the wireless communication are at the same time and location, which may ensure the continuous transmission of power, but when no wireless communication is established between the wireless communication module of the transmitter and the wireless communication module of the receiver, the wireless power transmission cannot be started.

In general, when the WPT process is started, the battery pack is usually used to provide auxiliary electrical energy to the receiver, to facilitate the establishing of the wireless communication between the receiver and the transmitter. However, when the battery pack electrically connected to the receiver is over-discharged and is not allowed to be further discharged, the receiver will lose the capacity of providing auxiliary power supply, and the controller and the wireless communication module of the receiver are unable to work. At this time, the WPT process is unable to be started, that is, the energy of the transmitter cannot be delivered to the receiver. Therefore, it is a current problem to establish an auxiliary power supply for the receiver to start a normal WPT process when the battery pack is over-discharged.

SUMMARY

In view of this, the present disclosure provides a wireless charging system and a control method thereof, which can establish an auxiliary power supply for the receiver in the case that the battery pack electrically connected to the receiver is over-discharged, so as to start the normal wireless power transmission.

According to an aspect of the present disclosure, a control method for a wireless charging system is provided. The wireless charging system includes a transmitter and a receiver, wherein the transmitter includes a power transmitting module, a transmitter control module, and a transmitter wireless communication module, the receiver includes a power receiving module, a receiver control module, and a receiver wireless communication module, and the wireless charging system is used for providing electrical energy to a battery pack. The control method includes:

when the battery pack is in an over-discharged state, controlling, by the transmitter control module, the power transmitting module to wirelessly transmit a first preset power to the power receiving module, so that the power transmitting module outputs auxiliary electrical energy to the power receiving module;

when the power receiving module receives the auxiliary electrical energy, controlling the transmitter wireless communication module to establish a wireless communication with the receiver wireless communication module;

after the wireless communication is established, controlling, by the transmitter control module, the power transmitting module to wirelessly transmit a first charge signal of a second preset power to the power receiving module, enabling the power receiving module to charge the battery pack at a first preset current; and obtaining a current working state of the battery pack and determining whether the battery pack recovers to a normal charging state, after determining that the battery pack recovers to the normal charging state, controlling, by the transmitter control module, the power transmitting module to wirelessly transmit a second charge signal of a third preset power to the power receiving module, enabling the power receiving module to charge the battery pack at a second preset current;

wherein the first preset power being lower than the second preset power, the second preset power being lower than the third preset power, and the second preset current being larger than the first preset current.

According to yet another aspect of the present disclosure, a wireless charging system for providing electrical energy to a battery pack is provided. The wireless charging system includes a transmitter and a receiver. The transmitter includes a power transmitting module, a transmitter control module and a transmitter wireless communication module. The receiver includes a power receiving module, a receiver control module, and a receiver wireless communication module. The transmitter control module is electrically connected between the power transmitting module and the transmitter wireless communication module, the receiver control module is electrically connected between the power receiving module and the receiver wireless communication module, and the battery pack is electrically connected to the power receiving module.

The transmitter control module is configured to: when the battery pack is in an over-discharged state, control the power transmitting module to wirelessly transmit a first preset power to the power receiving module, enabling the transmitter wireless communication module establishes a wireless communication with the receiver wireless communication module; and after the transmitter wireless communication module establishes the wireless communication with the receiver wireless communication module, control the power transmitting module to wirelessly transmit a first charge signal of a second preset power to the power receiving module, enabling the power receiving module charges the battery pack at a first preset current; when the battery pack recovers to a normal charging state, control the power transmitting module to wirelessly transmit a second charge signal of a third preset power to the power receiving module, enabling the power receiving module charges the battery pack at a second preset current; wherein the first preset power is lower than the second preset power, the second preset power is lower than the third preset power, and the second preset current is larger than the first preset current.

The beneficial effects of the present disclosure compared with the related art are as follows.

The wireless charging system and the control method thereof provided by the present disclosure achieve that when the battery pack in the device to be charged is over-discharged, that is, when an auxiliary power supply cannot be established for the receiver, the above control method provided by the present application can establish the auxiliary power supply for the receiver, to facilitate the establishment of the wireless communication between the receiver and the transmitter, so that a normal wireless power transmission between the transmitter and the receiver can be started, and thus the wireless charging can be carried out on the battery pack on the device to be charged.

BRIEF DESCRIPTION OF THE DRAWINGS

The accompanying drawings, which are incorporated in and constitute a part of this specification, illustrate embodiments consistent with the present disclosure and, together with the description, serve to explain the principles of the invention. It is obvious that the accompanying drawings described below are only some embodiments of the present disclosure, and for the person skilled in the art, other drawings may be obtained without paying creative labor.

FIG. 2 is a schematic diagram of a control method for a wireless charging system according to another embodiment of the present disclosure;

FIG. 3 is a schematic diagram of a control method for a wireless charging system according to another embodiment of the present disclosure;

FIG. 5 is a schematic diagram of a control method for a wireless charging system according to another embodiment of the present disclosure;

FIG. 6 is a schematic diagram of a control method for a wireless charging system according to another embodiment of the present disclosure.

DETAILED DESCRIPTION

Exemplary embodiments will now be described more comprehensively with reference to the accompanying drawings. However, the exemplary embodiments can be implemented in various forms, and should not be construed as being limited to the embodiments set forth herein. Instead, these embodiments are provided for making the present disclosure to be comprehensive and complete, and fully conveying the concepts of the exemplary embodiments to those skilled in the art. The described features, structures, or characteristics may be incorporated in one or more embodiments in any suitable way. In the following description, many specific details are provided to give a full understanding of the embodiments of the present disclosure. However, those skilled in the art will be aware that the technical solution of the present disclosure may be practiced without one or more of the particular details, or other methods, materials, apparatuses, and the like may be employed. In other cases, the well-known technical solutions are not shown or described in detail to avoid obscuring various aspects of the present disclosure. The same reference signs in the figures indicate the same or similar structures, and thus their detailed description will be omitted.

The terms "a", "an", "the", "said" and "at least one" are used to indicate the presence of one or more elements/components/etc.; the terms "include", "have" and "provide" are used to indicate open-ended inclusion and mean that other elements/components/etc. may be existed in addition to the listed elements/components/etc.

Figure 1:
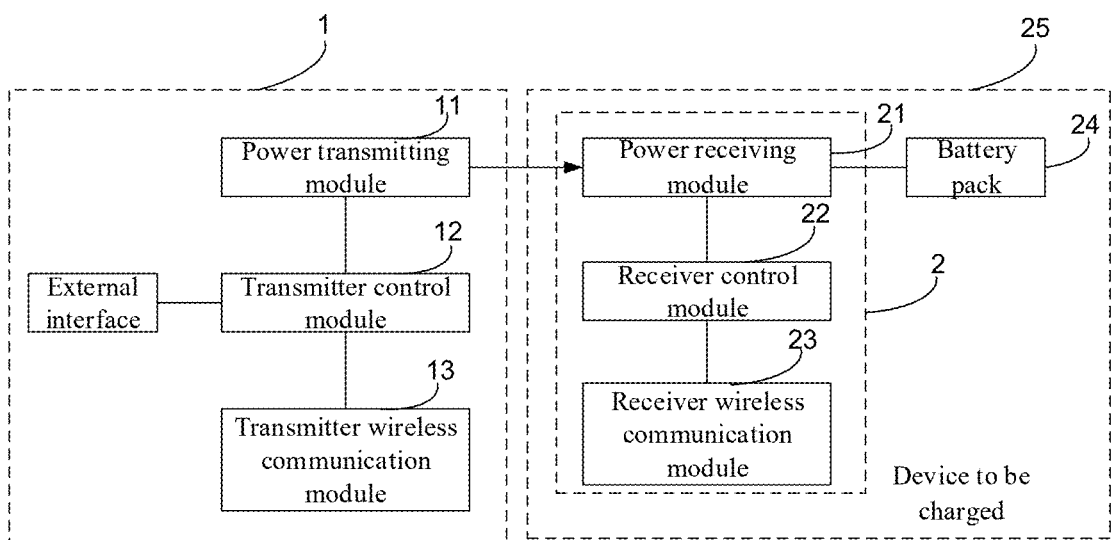
FIG. 1 is a schematic diagram of a structure of a wireless charging system according to an embodiment of the present disclosure.

An embodiment of the present disclosure discloses a control method for a wireless charging system. As shown in FIG. 1, the above wireless charging system includes a transmitter 1 and a receiver 2. The transmitter 1 includes a power transmitting module 11, a transmitter control module 12, and a transmitter wireless communication module 13. The receiver 2 includes a power receiving module 21, a receiver control module 22, and a receiver wireless communication module 23. The transmitter control module 12 is electrically connected between the power transmitting module 11 and the transmitter wireless communication module 13. The receiver control module 22 is electrically connected between the power receiving module 21 and the receiver wireless communication module 23, and the power receiving module 21 is electrically connected a battery pack 24. The above wireless charging system may be used to provide electrical energy to the battery pack 24. In some embodiments, the battery pack 24 and the receiver 2 of the wireless charging system are disposed on a device to be charged 25. That is, the power receiving module 21, the receiver control module 22, the receiver wireless communication module 23, and the battery pack 24 may all be disposed on the device to be charged 25. The power receiving module 21 is electrically connected to the battery pack 24 on the device to be charged 25, may convert the received radio electromagnetic energy into electric energy and transmit the electric energy to the battery pack 24 for charging. At the same time, the battery pack 24 may also provide auxiliary power supply energy to the receiver 2 when the battery pack is in operation.

In the present embodiment, as shown in FIG. 2, the control method applied to the above wireless charging system includes the following steps.

In S110, when the battery pack 24 is in an over-discharged state, the transmitter control module 12 controls the power transmitting module 11 to wirelessly transmit a first preset power to the power receiving module 21, so that the power transmitting module 11 outputs auxiliary electrical energy to the power receiving module 21.

In S120, when the power receiving module 21 receives the auxiliary electrical energy, the transmitter wireless communication module 13 is controlled to establish a wireless communication with the receiver wireless communication module 23. Optionally, a specific embodiment may be that the receiver control module 22 controls the receiver wireless communication module 23 to establish a wireless communication with the transmitter wireless communication module 13. The transmitter control module 12 controls the transmitter wireless communication module 13 to establish a wireless communication with the receiver wireless communication module 23.

In S130, after the wireless communication is established, the transmitter control module 12 controls the power transmitting module 11 to wirelessly transmit a first charge signal of a second preset power to the power receiving module 21, enabling the power receiving module 21 to charge the battery pack 24 at a first preset current.

In S140, a current working state of the battery pack 24 is obtained, and it is determined whether the battery pack 24 recovers to a normal charging state; if yes, step S150 is performed.

In S150, when determining that the battery pack 24 recovers to the normal charging state, the transmitter control module 12 controls the power transmitting module 11 to wirelessly transmit a second charge signal of a third preset power to the power receiving module 21, enabling the power receiving module 21 to charge the battery pack 24 at a second preset current.

The first preset power is lower than the second preset power. The second preset power is lower than the third preset power, and the second preset current is larger than the first preset current.

Specifically, when the battery pack 24 on the device to be charged 25 is in the over-discharged state, the transmitter control module 12 controls the power transmitting module 11 to wirelessly transmit low energy to the power receiving module 21, so that the auxiliary power supply is established to the device to be charged 25. After the auxiliary power supply for the device to be charged 25 is established, that is, when the power receiving module 21 in the receiver 2 receives the auxiliary power supply, the receiver 2 establishes wireless communication with the transmitter 1. The transmitter 1 then delivers a slightly higher power wireless energy to the receiver 2 and charges the battery pack 24 at a relatively small first preset current value, so that the battery pack 24 on the device to be charged 25 enters into a "recovery of battery with over-discharged" mode.

The current working state of the battery pack 24 is detected, and when the battery pack 24 is determined to recover to the normal charging state, the battery pack 24 is charged at the relatively large second preset current.

The present application thus achieves that when the battery pack 24 electrically connected to the wireless charging system is over-discharged, that is, when the battery pack 24 cannot establish an auxiliary power for the receiver, the above control method provided by the present application can provide and establish the auxiliary power supply for the receiver 2, so as to facilitate the establishment of the wireless communication between the receiver 2 and the transmitter 1, and enable a normal wireless power transmission between the transmitter 1 and the receiver 2, thereby realizing the wireless charging of the battery pack 24 on the device to be charged 25.

In some embodiments, as shown in FIG. 2, the above control method further includes:

when the battery pack 24 does not recover to the normal charging state, performing step S160: determining whether a time duration of the power receiving module 21 charging the battery pack 24 at the first preset current reaches a first preset time;

when the battery pack 24 does not recover to the normal charging state and the time duration of the power receiving module 21 charging the battery pack 24 at the first preset current reaches the first preset time, performing step S170: determining that the battery pack 24 is damaged, and controlling the power transmitting module 11 to stop transmitting the first charge signal by the transmitter control module 12; and when the battery pack 24 does not recover to the normal charging state and the time duration of the power receiving module 21 charging the battery pack 24 at the first preset current does not reach the first preset time, repeating step S140.

In some embodiments, on the basis of the corresponding embodiments in FIGS. 1 and 2, as shown in FIG. 3, in step S110, when it is determined that the battery pack 24 is in the over-discharged state, a preset operation is performed on an external interface electrically connected to the transmitter control module 12 enabling the transmitter control module 12 to control the power transmitting module 11 to wirelessly transmit the first preset power to the power receiving module 21. That is, when the preset operation is performed on the external interface electrically connected to the transmitter control module 12, the transmitter control module 12 is triggered to perform step S110 of controlling the power transmitting module 11 to wirelessly transmit the first preset power to the power receiving module 21. That is, after the preset operation is performed on the external interface electrically connected to the transmitter control module 12, the transmitter control module 12 may know that the next task is "entering a certain working state, to recover the battery with over-discharged", so as to start to wirelessly deliver low energy to the receiver 2 to make the receiver 2 establish an auxiliary power supply.

The above-mentioned performing the preset operation on the external interface electrically connected to the transmitter control module 12 may be implemented through the following implementation manners.

The preset operation is performed on the external interface based on a mechanical structure, where the mechanical structure is connected to the external interface (such as pressing a preset button continuously for a certain time); and/or preset information is sent to the external interface, where the external interface is a communication interface (such as Ethernet, CAN-Bus, etc.); and/or the preset operation is performed on the external interface based on a human-machine interface device, where the human-machine interface device is connected to the external interface, which are not limited by the present application.

Figure 4:
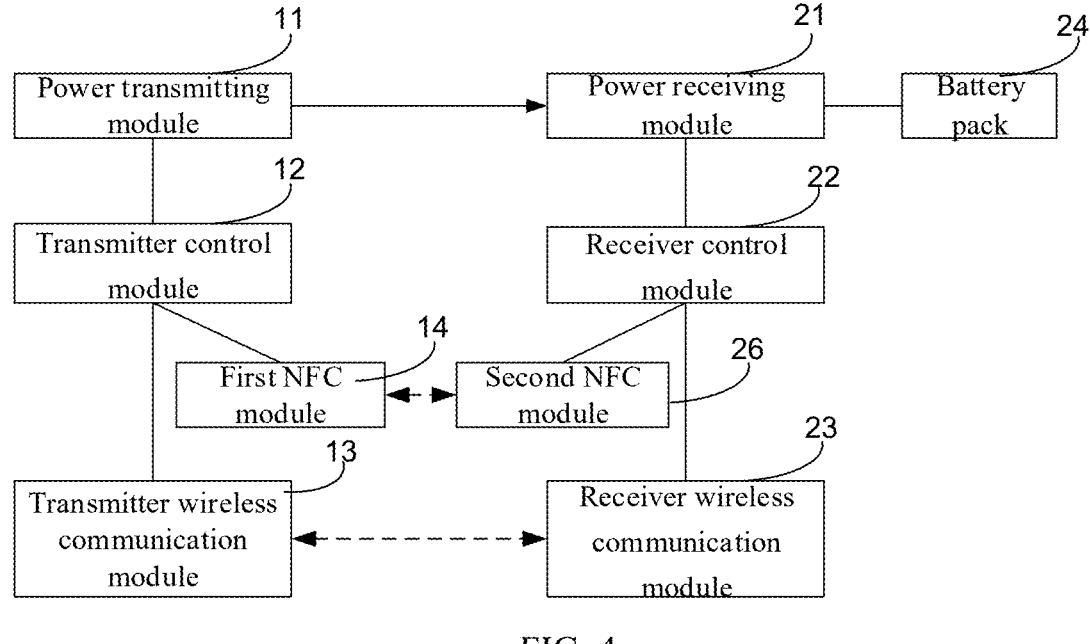
FIG. 4 is a schematic diagram of a structure of a wireless charging system according to another embodiment of the present disclosure.

In some embodiments, as shown in FIG. 4, the wireless charging system may further include a plurality of near field communication (NFC) modules. Specifically, the transmitter 1 may further include a first NFC module 14, and the first NFC module 14 may be electrically connected to the transmitter control module 12, for example. The receiver 2 may further include a second NFC module 26, and the second NFC module 26 may be electrically connected to the receiver control module 22, for example. In step S110, when the battery pack 24 is in the over-discharged state, the second NFC module 26 works in a card simulator mode, and the second NFC module 26 in the card simulator mode may not need a power supply and may provide its identification. On the basis of the corresponding embodiment of FIG. 2, as shown in FIG. 5, in this embodiment, when the battery pack 24 is in the over-discharged state, step S110 further includes:

providing identification via the second NFC module 26;

controlling the first NFC module 14 to be in a reader/writer mode, reading the above identification and identifying the above identification, if the identification is passed, the transmitter control module 12 controlling the power transmitting module 11 to wirelessly transmit the first preset power to the power receiving module 21, so that the power transmitting module 11 outputs auxiliary electrical energy to the power receiving module 21.

Specifically, if the identification is passed, it is determined that the receiver 2 and the transmitter 1 are matched. Only when the receiver 2 is matched to the transmitter 1, the transmitter control module 12 can control the power transmitting module 11 to wirelessly transmit the first preset power to the power receiving module 21, so that the power transmitting module 11 outputs the auxiliary electrical energy to the power receiving module 21.

In some embodiments, on the basis of the corresponding embodiment of FIG. 5, as shown in FIG. 6, step S120 may further include:

after the power receiving module 21 receives the auxiliary electrical energy, controlling a working mode of the first NFC module 14 to be switched to a peer-to-peer mode, and controlling a working mode of the second NFC module 26 to be switched to the peer-to-peer mode, so that the first NFC module 14 establishes the wireless communication with the second NFC module 26; after the first NFC module 14 and the above second NFC module 26 establish the wireless communication, the transmitter control module 12 controlling the power transmitting module 11 to wirelessly transmit the first charge signal of the second preset power to the power receiving module 21, to start a normal wireless power transmission between the transmitter 1 and the receiver 2.

In some embodiments, the first NFC module 14 and the transmitter wireless communication module 13 may be combined into one module; and/or, the second NFC module 26 and the receiver wireless communication module 23 may be combined into another module, which is not restricted in the present application. That is, the first NFC module 14 is used to implement the function of the transmitter wireless communication module 13, and/or the second NFC module 26 is used to implement the function of the receiver wireless communication module 23. In this case, the near field communication between the two NFC modules is used to realize the wireless communication between the transmitter and the receiver.

In some embodiments, step S140 includes: obtaining the current working state of the battery pack 24 through the receiver control module 22 and determining whether the battery pack 24 recovers to the normal charging state based on the current working state.

Figure 7:
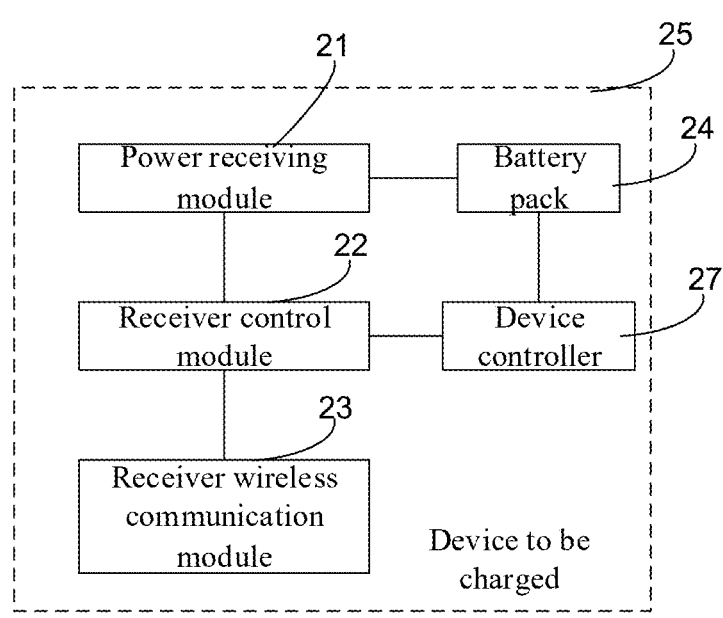
FIG. 7 is a schematic diagram of a structure of a device to be charged in a wireless charging system according to another embodiment of the present disclosure.

A specific implementation of obtaining the current working state of the battery pack 24 through the receiver control module 22 may be: the receiver control module 22 obtaining the current working state of the battery pack 24 through a battery management system of the battery pack 24. Alternatively, as shown in FIG. 7, a device controller 27 is further disposed on the device to be charged 25, and both the receiver control module 22 and the battery pack 24 are electrically coupled to the device controller 27. The device controller 27 detects the current working state of the battery pack 24 and provides the current working state to the receiver control module 22. The device controller 27 may be connected to the receiver control module 22 by a certain communication interface (such as CAN-Bus), or a certain digital signal General Purpose Input/Output (GPIO) port. Correspondingly, the device controller 27 sends the detected current working state of the battery pack 24 to the receiver control module 22 of the receiver 2, which may be implemented by a preset message in the communication interface, or by a preset level state of the digital signal.

Optionally, the determination of whether the battery pack 24 recovers to the normal charging state may also be performed by detecting the operating voltage of the battery pack 24, and determining whether the operating voltage recovers to a preset value, by the receiver control module 22.

If the operating voltage of the battery pack 24 recovers to the preset value, it is determined that the battery pack 24 recovers to a normal charging state.

The present disclosure further provides a wireless charging system configured to provide electrical energy to the battery pack 24 and may be operated using the control method in the above described embodiments. The detailed structural features and advantages of the wireless charging system may be described with reference to the above described embodiments and will not be repeated herein.

In summary, the wireless charging system and the control method thereof in the present disclosure have at least the following advantages.

The wireless charging system and the control method thereof disclosed in the present application achieve that when the battery pack electrically connected to the wireless charging system is over-discharged, that is, when the battery pack is unable to establish an auxiliary power supply for the receiver, the above control method provided in the present disclosure can establish the auxiliary power supply for the receiver, to facilitate the establishment of the wireless communication between the receiver and the transmitter, so that a normal wireless power transmission between the transmitter and the receiver is started, thereby realizing wireless charging of the battery pack on the device to be charged.

The above content is a further detailed description of the present disclosure in combination with specific embodiments, and it cannot be concluded that the implementation of the present disclosure is limited to such description. For a person of ordinary skill in the art of the present disclosure, several simple deductions or substitutions may be made without departing from the concept of the present disclosure, all of which should be considered as falling within the scope of protection of the present disclosure.

What is claimed is:

1. A control method for a wireless charging system, wherein the wireless charging system comprises a transmitter and a receiver, wherein the transmitter comprises a power transmitting module, a transmitter control module, and a transmitter wireless communication module, the receiver comprises a power receiving module, a receiver control module, and a receiver wireless communication module, and the wireless charging system is used for providing electrical energy to a battery pack; the control method comprises:

when the battery pack is in an over-discharged state, controlling, by the transmitter control module, the power transmitting module to wirelessly transmit a first preset power to the power receiving module, so that the power transmitting module outputs auxiliary electrical energy to the power receiving module;

when the power receiving module receives the auxiliary electrical energy, controlling the transmitter wireless communication module to establish a wireless communication with the receiver wireless communication module;

after the wireless communication is established, controlling, by the transmitter control module, the power transmitting module to wirelessly transmit a first charge signal of a second preset power to the power receiving module enabling the power receiving module to charge the battery pack at a first preset current; and obtaining a current working state of the battery pack and determining whether the battery pack recovers to a normal charging state, when determining that the battery pack recovers to the normal charging state, controlling, by the transmitter control module, the power transmitting module to wirelessly transmit a second charge signal of a third preset power to the power receiving module enabling the power receiving module to charge the battery pack at a second preset current; wherein the first preset power is lower than the second preset power, the second preset power is lower than the third preset power, and the second preset current is larger than the first preset current.

2. The control method for a wireless charging system according to claim 1, wherein the control method further comprises:

when determining that the battery pack does not recover to the normal charging state and a time duration of the power receiving module charging the battery pack at the first preset current reaches a first preset time, determining that the battery pack is damaged, and controlling, by the transmitter control module, the power transmitting module to stop transmitting the first charge signal; and when determining that the battery pack does not recover to the normal charging state and the time duration of the power receiving module charging the battery pack at the first preset current does not reach the first preset time, repeating a step of obtaining the current working state of the battery pack and determining whether the battery pack recovers to the normal charging state.

3. The control method for a wireless charging system according to claim 1, wherein the wireless charging system further comprises an external interface, the external interface is electrically connected to the transmitter control module; and when the battery pack is in the over-discharged state, the control method further comprises:

performing a preset operation on the external interface enabling the transmitter control module to control the power transmitting module to wirelessly transmit the first preset power to the power receiving module.

4. The control method for a wireless charging system according to claim 3, wherein the performing the preset operation on the external interface, comprises:

performing the preset operation on the external interface based on a mechanical structure, wherein the mechanical structure is connected to the external interface; and/or sending preset information to the external interface, wherein the external interface is a communication interface; and/or performing the preset operation on the external interface based on a human-machine interface device, wherein the human-machine interface device is connected to the external interface.

5. The control method for a wireless charging system according to claim 1, wherein the transmitter further comprises a first near field communication (NFC) module, and the receiver further comprises a second NFC module; when determining that the battery pack is in the over-discharged state, the control method further comprises:

providing identification through the second NFC module; and controlling the first NFC module to be in a reader/writer mode, reading the identification and identifying the identification, when the identification is passed, determining that the receiver is matched to the transmitter, and enabling the transmitter control module to control the power transmitting module to wirelessly transmit the first preset power to the power receiving module.

6. The control method for a wireless charging system according to claim 5, wherein after controlling, by the transmitter control module, the power transmitting module to wirelessly transmit the first preset power to the power receiving module, so that the power transmitting module outputs the auxiliary electrical energy to the power receiving module, the control method further comprises:

controlling, by the transmitter control module, a working mode of the first NFC module to be switched to a peer-to-peer mode, and controlling, by the receiver control module, a working mode of the second NFC module to be switched to the peer-to-peer mode, enabling the first NFC module and the second NFC module to establish the wireless communication.

7. The control method for a wireless charging system according to claim 1, wherein the obtaining the current working state of the battery pack, comprises:

obtaining the current working state of the battery pack through the receiver control module.

8. The control method for a wireless charging system according to claim 7, wherein the obtaining the current working state of the battery pack through the receiver control module, comprises:

obtaining the current working state through a battery management system of the battery pack, and providing the current working state to the receiver control module.

9. The control method for a wireless charging system according to claim 7, wherein the receiver control module and the battery pack are electrically coupled to a device controller, and the obtaining the current working state of the battery pack through the receiver control module, comprises:

detecting the current working state of the battery pack through the device controller, and providing the current working state to the receiver control module.

10. The control method for a wireless charging system according to claim 1, wherein the controlling the transmitter wireless communication module to establish the wireless communication with the receiver wireless communication module, comprises:

controlling, by the receiver control module, the receiver wireless communication module to establish the wireless communication with the transmitter wireless communication module; and controlling, by the transmitter control module, the transmitter wireless communication module to establish the wireless communication with the receiver wireless communication module.

11. The control method for a wireless charging system according to claim 1, wherein the receiver and the battery pack are disposed on a device to be charged.

12. A wireless charging system for providing electrical energy to a battery pack, wherein the wireless charging system comprises a transmitter and a receiver, the transmitter comprises a power transmitting module, a transmitter control module, and a transmitter wireless communication module, the receiver comprises a power receiving module, a receiver control module, and a receiver wireless communication module, wherein the transmitter control module is electrically connected between the power transmitting module and the transmitter wireless communication module, the receiver control module is electrically connected between the power receiving module and the receiver wireless communication module, and the battery pack is electrically connected to the power receiving module;

wherein the transmitter control module is configured to:

when the battery pack is in an over-discharged state, control the power transmitting module to wirelessly transmit a first preset power to the power receiving module, enabling the transmitter wireless communication module to establish a wireless communication with the receiver wireless communication module; and after the transmitter wireless communication module establishes the wireless communication with the receiver wireless communication module, control the power transmitting module to wirelessly transmit a first charge signal of a second preset power to the power receiving module, enabling the power receiving module to charge the battery pack at a first preset current; when that the battery pack recovers to a normal charging state, control the power transmitting module to wirelessly transmit a second charge signal of a third preset power to the power receiving module, enabling the power receiving module to charge the battery pack at a second preset current;

wherein the first preset power is lower than the second preset power, the second preset power is lower than the third preset power, and the second preset current is larger than the first preset current.

13. The wireless charging system according to claim 12, wherein the transmitter control module is further configured to: when a time duration of the power receiving module charging the battery pack at the first preset current reaches a first preset time and the battery pack does not recover to the normal charging state, control the power transmitting module to stop transmitting the first charge signal; and when the time duration of the power receiving module charging the battery pack at the first preset current does not reach the first preset time, and the battery pack does not recover to the normal charging state, control the receiver control module to obtain a current working state of the battery pack and determine whether the battery pack recovers to the normal charging state.

14. The wireless charging system according to claim 12, wherein the wireless charging system further comprises an external interface, the external interface is electrically connected to the transmitter control module, after performing a preset operation on the external interface, the transmitter control module is configured to control the power transmitting module to wirelessly transmit the first preset power to the power receiving module.

15. The wireless charging system according to claim 14, wherein the performing the preset operation on the external interface comprises: performing the preset operation on the external interface based on a mechanical structure, wherein the mechanical structure is connected to the external interface; and/or sending preset information to the external interface, wherein the external interface is a communication interface; and/or performing the preset operation on the external interface based on a human-machine interface device, wherein the human-machine interface device is connected to the external interface.

16. The wireless charging system according to claim 12, wherein the transmitter comprises a first NFC module, and the receiver comprises a second NFC module, the second NFC module is configured to provide identification when the battery pack is in the over-discharged state; and the first NFC module is configured to: when the battery pack is in the over-discharged state, work in a reader/writer mode, read the identification and identify the identification, and when the identification is passed, determine that the receiver is matched to the transmitter, and enable transmitter control module to control the power transmitting module to wirelessly transmit the first preset power to the power receiving module.

17. The wireless charging system according to claim 16, wherein the first NFC module is further configured to: after the transmitter control module controls the power transmitting module to wirelessly transmit the first preset power to the power receiving module enabling the power transmitting module to output auxiliary electrical energy, switch a working mode to a peer-to-peer mode and establish the wireless communication with the second NFC module; and the second NFC module is further configured to: after the transmitter control module controls the power transmitting module to wirelessly transmit the first preset power to the power receiving module, so that the power transmitting module outputs the auxiliary electrical energy, switch a working mode to the peer-to-peer mode and establish the wireless communication with the first NFC module.

18. The wireless charging system according to claim 12, wherein the receiver control module is configured to, before determining whether the battery pack recovers to the normal charging state, obtain a current working state of the battery pack.

19. The wireless charging system according to claim 18, wherein the receiver control module obtains the current working state of the battery pack through a battery management system of the battery pack.

20. The wireless charging system according to claim 18, wherein the receiver control module and the battery pack are electrically coupled to a device controller, and the receiver control module obtains the current working state through the device controller.

21. The wireless charging system according to claim 12, wherein the transmitter control module is further configured to control the transmitter wireless communication module to establish the wireless communication with the receiver wireless communication module; and the receiver control module is further configured to control the receiver wireless communication module to establish the wireless communication with the transmitter wireless communication module.

22. The wireless charging system according to claim 12, wherein the receiver and the battery pack are disposed on a device to be charged.

* * * * *